(12) United States Patent
Lenkenhoff et al.

(10) Patent No.: US 9,598,100 B2
(45) Date of Patent: Mar. 21, 2017

(54) DEVICE FOR CONNECTING A STEERING COLUMN TO A CROSSMEMBER

(71) Applicant: Kirchhoff Automotive Deutschland GmbH, Attendorn (DE)

(72) Inventors: Christian Lenkenhoff, Schwelm (DE); Rolf Schwarzer, Siegen (DE); Frank Rohlfs, Hagen (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 0 days.

(21) Appl. No.: 14/782,056

(22) PCT Filed: Jun. 13, 2014

(86) PCT No.: PCT/EP2014/062339
§ 371 (c)(1),
(2) Date: Oct. 2, 2015

(87) PCT Pub. No.: WO2014/202475
PCT Pub. Date: Dec. 24, 2014

(65) Prior Publication Data
US 2016/0059878 A1    Mar. 3, 2016

(30) Foreign Application Priority Data

Jun. 19, 2013   (DE) .......................... 10 2013 106 384

(51) Int. Cl.
*B62D 1/16* (2006.01)
*B62D 25/14* (2006.01)
*B62D 29/04* (2006.01)

(52) U.S. Cl.
CPC ............. *B62D 1/16* (2013.01); *B62D 25/145* (2013.01); *B62D 29/04* (2013.01)

(58) Field of Classification Search
CPC ................................ B62D 1/16; B62D 25/145
(Continued)

(56) References Cited

U.S. PATENT DOCUMENTS 5,052,240 A * 10/1991 Miyoshi ................ B62D 1/195
280/775
5,180,189 A * 1/1993 Moreno ................ B62D 1/195
219/91.21
(Continued)

FOREIGN PATENT DOCUMENTS

DE    102004051182 A1    6/2005
DE    102004025245 A1    12/2005
(Continued)

OTHER PUBLICATIONS

Written Opinion of the International Searching Authority—PCT/EP2014/066782 dated Oct. 17, 2014.
(Continued)

*Primary Examiner* — Ruth Ilan
(74) *Attorney, Agent, or Firm* — Polson Intellectual Property Law, PC; Margaret Polson

(57) ABSTRACT

A device for connecting a steering column to a cross member positioned between two A-pillars. The device comprises a front connecting region, a cross member-accommodating region, and a rear connecting region. The device comprises at least one metal structure, which is designed as a bow or comprises at least one such bow, extending from the front connecting region to the rear connecting region. A base body supports the metal structure. The metal structure is substantially the main load path for introducing force into the cross member. The base body is connected to the metal structure in at least the front connecting region and rear connecting region, in the direction of the main load path.

20 Claims, 8 Drawing Sheets

(58) Field of Classification Search
USPC .......................................................... 280/779
See application file for complete search history.

(56) References Cited

U.S. PATENT DOCUMENTS

| | | | | |
|---|---|---|---|---|
| 6,450,533 | B1 * | 9/2002 | Kimura | B62D 25/145 |
| | | | | 180/90 |
| 9,156,488 | B1 * | 10/2015 | McCabe | B62D 1/16 |
| 2005/0093285 | A1 * | 5/2005 | Lee | B60R 21/09 |
| | | | | 280/779 |
| 2005/0275207 | A1 * | 12/2005 | Park | B62D 25/145 |
| | | | | 280/779 |
| 2012/0049573 | A1 * | 3/2012 | Atsumi | B62D 25/145 |
| | | | | 296/193.02 |

FOREIGN PATENT DOCUMENTS

| | | | | |
|---|---|---|---|---|
| DE | 102007002431 A1 | 8/2007 | | |
| FR | 2925450 A1 * | 6/2009 | ............. | B62D 1/195 |
| FR | 2933368 A1 * | 1/2010 | ............... | B62D 1/16 |
| JP | 11301518 A * | 11/1999 | | |

OTHER PUBLICATIONS

International Preliminary Report on Patentability—PCT/EP2014/066782 dated Dec. 30, 2015.

* cited by examiner

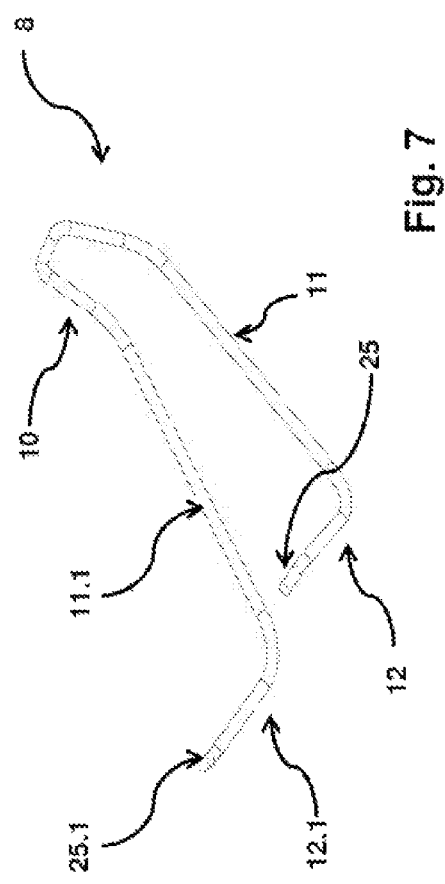
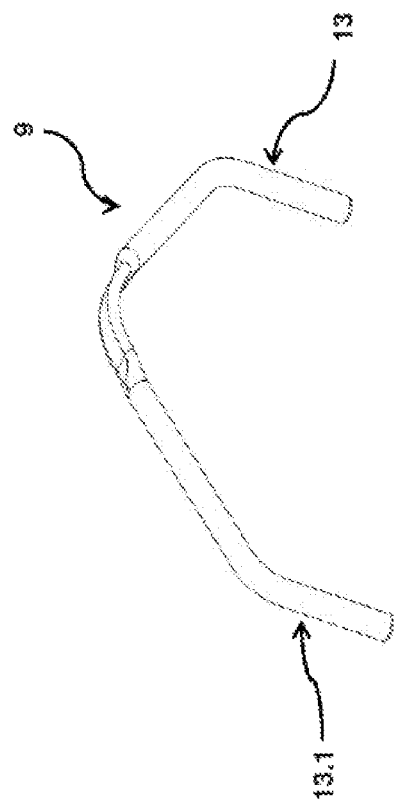

DEVICE FOR CONNECTING A STEERING COLUMN TO A CROSSMEMBER

CROSS REFERENCE APPLICATIONS

This application is a non-provisional application claiming the benefits of provisional application no. filed.

BACKGROUND

The invention relates to a device for connecting a steering column to a cross member positioned between two A-pillars of a vehicle. The device comprises a front connecting region, a cross member-accommodating region, and a rear connecting region.

To reduce emissions, automobile manufacturers endeavor to design lighter and lighter vehicles. At the same time, however, manufacturers are obligated to fulfill ever-increasing legal safety requirements. This is sometimes a great design challenge for many components or assemblies, especially since these components or assemblies must generally be particularly high strength in order to meet legal requirements.

Many automobile manufacturers are switching over to modularly constructing as many assemblies of a vehicle as possible so that these assemblies are versatile in application and are easy to assemble. Because of this modular construction, it is also possible to produce many modules of a component or of an assembly in different locations, and therefore minimize the logistical complexities associated with fully assembled assemblies.

To produce devices for connecting a steering column to a cross member, the known prior art predominantly uses steel sheet shells, die-cast components, or plastic-metal hybrid structures injection-molded directly on the cross member. These approaches usually consist of many individual components having associated high joining costs, and require high investment costs for progressive tools. Although it is known and common to use topology analyses during a design process, the traditional devices for connecting a steering column to a cross member are only conditionally designable in a load-path-oriented manner in the case of the sheet-metal shell design, and therefore over dimensioning necessarily results. Therefore, these devices are heavy and/or cannot be used modularly due to their complex assembly.

As an example, it is clear from DE 10 2004 025 245 A1 that two metal inserts are used therein to connect a steering column, wherein bores are provided in these metal inserts for this purpose. In addition to the structure of the metal inserts illustrated in FIG. 3 of that published patent application, it also emerges from these bores that the metal inserts are realized in the sheet metal shell design. Thereafter, in a subsequent injection-molding cycle, the metal inserts are furthermore directly injection-molded onto the cross member in order to establish a connection to the cross member.

A disadvantage of this prior art is that the design of the corresponding device for connecting a steering column is not optimized with regard to the load path, thereby resulting in a higher weight. In addition, this type of design results in less flexibility. This is because additional logistical expenses are connected therewith, since the cross member must be shipped again for further final assembly and because the cross member has significantly more unwieldy dimensions from overmolding. Increased tool expenditures are also necessary in order to achieve accurate positioning of the device, and therefore a tolerance compensation can be realized only at great expense. In addition, modular usability is precluded because specific tools must be used to realize a connection.

Furthermore, a structure of a steering column support for increasing the stiffness of the steering column support and of a dashboard cross element is known from DE 10 2007 002 431 B4. The steering column support is formed from a combination of a fork plate or stop plate and an accommodating main body, and thus is formed as a pair of right and left mounting segments. The fork plate and the accommodating main body are composed of metal and joined by welding.

A disadvantage of this steering column support structure is that the design is likewise not optimized in a load-path-oriented manner. Rather, the fork plate or stop plate serves as a closing plate for the accommodating main body in order to realize a required stiffness. Because a support unit thus formed has to be designed as a pair and in the manner of a shell, a higher weight, more complex production methods, and assembly difficulties result. In addition, design freedom with regard to a connection of clips, retainers, etc. can be implemented only by means of increased complexity.

In DE 10 2004 051 182 B4, a further steering-column holding structure is shown. A column-holding support is attached to a firewall support and a column-holding extension by means of pedals. The pedals are pivotally fastened to a dashboard by means of a pedal support. The column-holding support is designed in a shell shape as a closed profile having a column-holding extension, which furthermore is attached as an additional component. Thus, the column-holding support is not optimally designed in a weight-oriented or load-path-oriented manner.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The aim of the invention is to provide a device for connecting a steering column to a cross member, or so-called cross car beam, that eliminates or at least reduces the problems of the prior art.

This aim is achieved by means of a device comprising at least one metal structure, which is designed as a bow or has at least one such bow, extending from the front connecting region to the rear connecting region, and a base body that supports the metal structure. The metal structure is the main load path for introducing force into the cross member. The base body is connected to the metal structure in the direction of the main load path at least in the front connecting region and in the rear connecting region.

In this invention of a device for connecting a steering column to a cross member, the steel shell components predominantly used in the prior art are replaced by a construction of a modularly produced connecting device, namely by a load-path-optimized metal structure having at least one bow and having a base body. According to a preferred embodiment, the base body is a plastic body in which fibers are contained for reinforcement, particularly having a polymeric matrix. The base body serves as a supporting structure to hold individual segments of the metal structure in their intended spatial position relative to each other when force is introduced into the cross member via the main load path. These segments of the metal structure are partial bow segments that project away from the cross member. For this reason, the metal structure is connected to the base body in the front connecting region and in the rear connection region. If the base body is a plastic part, it is advantageous for these parts of the bow segments to be at least partially accommodated and/or enclosed in the plastic base body. In such an embodiment, the bow-like metal structure is preferably accommodated in or surrounded by the plastic base body in the front connecting region and rear connecting region of the metal structure so that the accommodation and/or surrounding is not only positively locking in the direction of the main load path, but also positively locking in at least one direction transverse thereto. Especially preferred is an embodiment in which the metal structure is connected in the stated regions to the base body in such a way that evasion of the partial bow segments is prevented when force is applied as intended. This can be achieved, for example, by means of a bonded joint. If the connecting device is a hybrid component, it is advantageous for the corresponding parts of the partial bow segments to be connected to the base body in a positively locking manner, i.e., in such a way that the base body at least partially accommodates and/or surrounds the corresponding segments of the partial bow segments.

The base body may be designed in such a way that the aforementioned supporting function of the metal structure is ensured for a specified introduction of force. By means of the base body's support to the at least one bow of the metal structure, the at least one bow of the metal structure retains its form within the limits of the supporting force that can be absorbed by the base body, so that an introduction of force into the cross member via the main load path provided by the at least one metal bow is ensured when the device is used as intended. If this force is exceeded, which is possible in the event of a crash, the supporting function of the base body can be exceeded so that despite a possible failure of the base body, the connected components (e.g., steering column) still remain connected to the cross member by means of the metal structure.

According to a further embodiment, the metal structure substantially represents the base structure of the device and the base body is optionally connected to a firewall designed for the engine compartment in order to form a further load path.

In a preferred embodiment, the metal structure consists of a first and two second bent metal bows, which each correspond to a load path typically investigated in a topology analysis. If the base body is a base body composed of a polymeric material, the first metal bow is at least partially surrounded by and/or embedded in the polymeric matrix of the base body, and the two second metal bows are designed as closing bows and can be inserted into and/or through the base body. The base body itself is preferably designed at least partially in a shell form with corresponding closing-bow-accommodating devices.

The thus-formed base body of the device for connecting a steering column can be attached to any points of the cross member by means of a cross member-accommodating region and can be fastened by means of the closing bows. The metal bows, which accordingly lie against the cross member at least in partial regions, preferably can be additionally connected to these points by means of a thermal joining method. In this case, it becomes clear that the device for connecting a steering column can be used modularly for both so-called left-hand drive vehicles and right-hand drive vehicles. In addition, tolerances can be more easily compensated.

In a preferred embodiment with the first metal bow substantially representing the base structure of the base body of the device, the first metal bow is V-shaped or U-shaped and bent in a load-path-optimized manner in order to better absorb force. The first metal bow points upward and forward in a front region and, in a further partial region, lies against the cross member contour at least in partial regions, and the corresponding two ends of the metal bow point upward and inward in order to contact the closing bows on the inside thereof.

When the terms "upward," "forward," "downward," or "inward" are used in the context of these embodiments, these terms describe the standardized directions in a vehicle, wherein "forward" and "rearward" are directions in the x axis, "upward" and "downward" are directions in the z axis, and "inward" refers to directions in the y axis.

Because higher loads are sometimes introduced into the closing bows of the device during normal operation, the closing bows are designed thicker than the preferably V- or U-shaped metal bow in a further preferred embodiment.

In a further preferred embodiment, several closing-bow guides for accommodating the closing bows are introduced in the base body. In addition, any number of stiffening elements, retainers, and/or cable guides can be attached to, introduced into, injection-molded onto, and/or integrated in the base body.

Furthermore, in a further preferred embodiment, the base body is designed in the manner of a skeleton or as a solid body.

The present device for connecting a steering column is extremely variable with regard to the design possibilities and additionally provides the advantage in flexibility required by automobile manufacturers for packaging space designs, e.g., with regard to size and geometry. Also, over dimensioning of the device is at least reduced in comparison with the prior art by using metal bows for load-path-oriented optimization, thereby resulting in weight savings.

In such an embodiment, a further advantage of the invention is that the steel sheet shells, die-cast components, and plastic-metal hybrid structures injection-molded directly onto the cross member of the prior art can be dispensed with. Thus, the number of required work steps is reduced and the production of the device according to the invention can be realized relatively economically.

Furthermore, a further advantage of the invention is that the present device is not injection-molded onto a cross member, but rather is produced initially detached from the cross member. Because of this, these elements can also be flexibly produced at a different location than the cross member and thus can also be more effectively sent logistically than a cross member having a device for connecting a steering column that is injection-molded onto the cross member. In addition, such devices can be also be used modularly for left-hand and right-hand drive vehicles for increased flexibility, can contribute to the compensation of tolerances, and additionally can be produced in an optimized manner with orientation toward the load path even in the case of the most complicated geometries.

Accordingly, a load-path-optimized device preferably designed clearly shows that the problems discussed at the beginning with respect to the prior art have been eliminated or at least reduced. With corresponding weight savings because of the optimal use of various materials, both easier and more economical manufacturability has been achieved while complying with the required legal provisions regarding various crash requirements at the same time. In addition, the device is extremely flexible with regard to packaging space designs and prevents over dimensioning of the device, thereby resulting in weight savings. In this regard, it is particularly advantageous that the device, although it is a so-called hybrid part, is not injection-molded onto a cross member but rather produced initially detached from the cross member. This is against the background that the necessary systems and the associated know-how, particularly thermal methods for joining, are available or known in the industry. Thus, logistical challenges can also be more easily overcome by applying known methods.

All possibilities obvious to a person skilled in the art can be used in the assembly and the design implementation of the present optimized load-path-oriented device for connecting a steering column.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Below, the invention is described on the basis of example embodiments with reference to the attached drawings, wherein further advantages and preferred embodiments of the present invention will become clear to a person skilled in the art.

FIG. 7 is a perspective view of the first metal bow of the device for connecting a steering column of the embodiment in FIG. 1.

FIG. 8 is a perspective view of the second metal bow of the device for connecting a steering column of the embodiment in FIG. 1.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
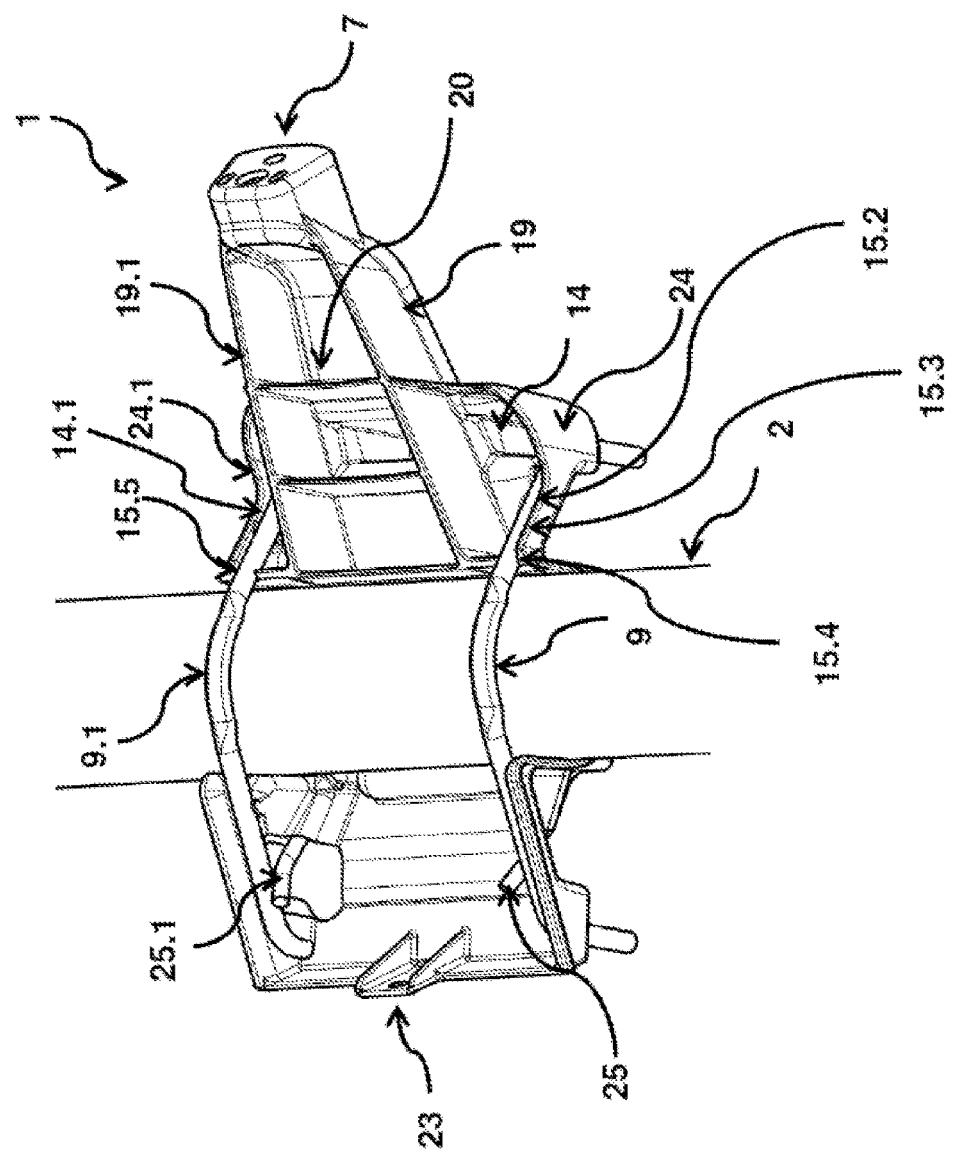
FIG. 1 is a perspective view of an embodiment of the device for connecting a steering column according to the present invention.
Figure 2:
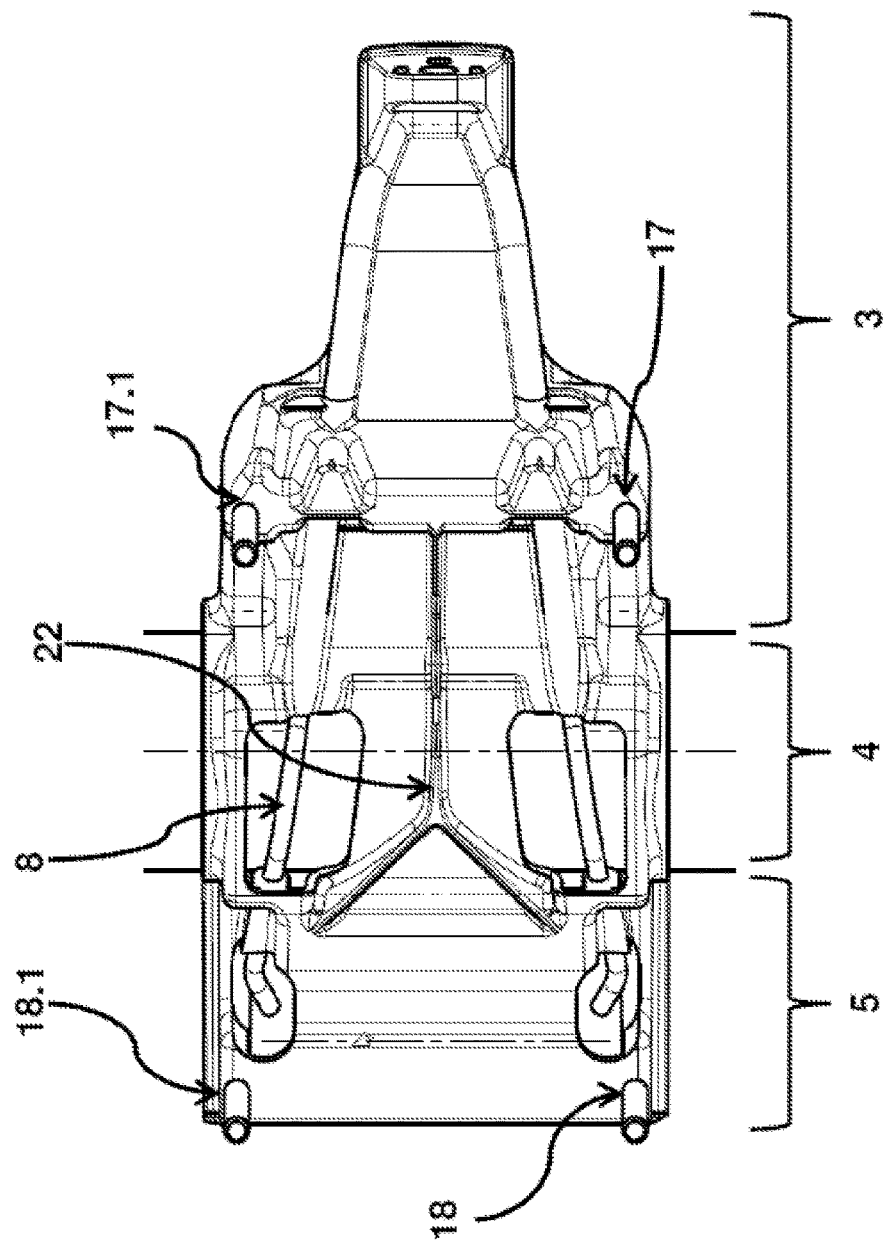
FIG. 2 is a bottom view of the device for connecting a steering column of the embodiment in FIG. 1.
Figure 3:
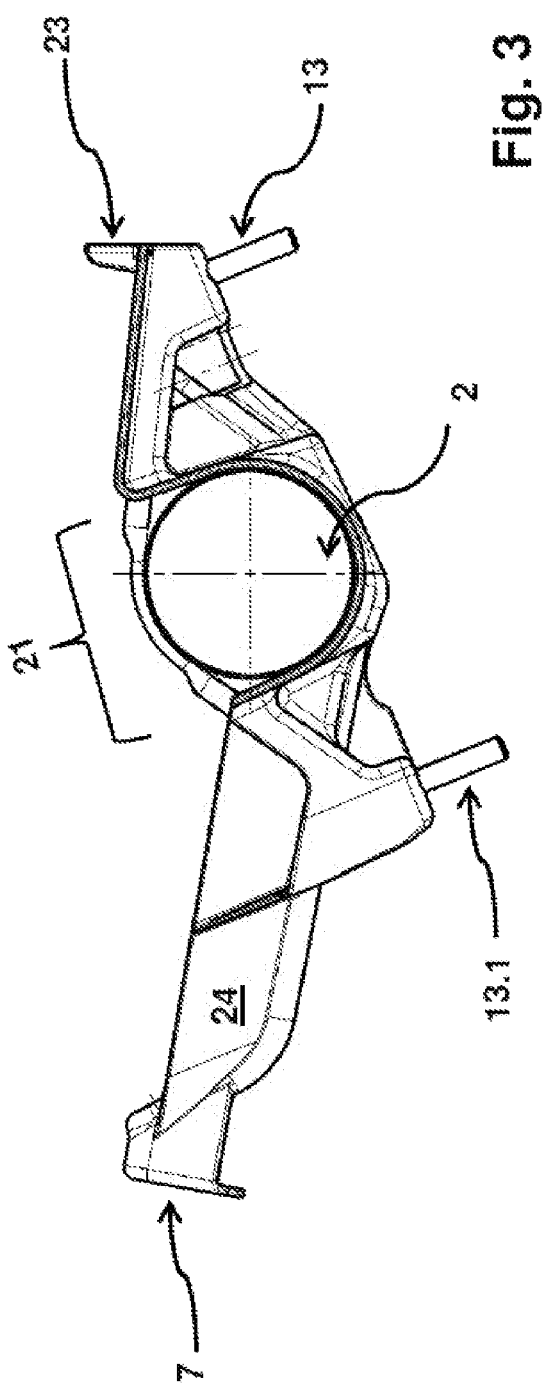
FIG. 3 is a side view of the device for connecting a steering column of the embodiment in FIG. 1.

In FIGS. 1 to 3, a device 1 for connecting a steering column is shown, which device 1 is arranged on a cross member 2 positioned between two A-pillars and comprises a front connecting region 3, a cross member-accommodating region 4, and a rear connecting region 5, wherein the device 1 further comprises a metal structure 8, which consists of at least one wire bow, and a base body 6 composed of polymeric material (plastic).

As can be seen in the figures, the metal structure 8 extends largely in the x-axis direction, while the cross member 2 extends in the y-axis direction. The metal structure 8 is preferably produced in accordance with the results of a performed topology analysis. Such topology analyses and such topology analysis tools are well known. Therefore, this analysis and these analysis methods and tools are not discussed herein. In other words, the metal structure 8 is designed as a main load path for the predominant introduction of force into the cross member 2. This does not mean that force cannot also be introduced into the cross member 2 by means of other components during use as intended. However, an introduction of force by means of these other components occurs only to a subordinate extent. Without over-dimensioning of the metal structure 8, it is possible to produce an optimized device wherein the base body 6 at least partially accommodates and/or encloses the metal structure 8 in the polymeric matrix of the base body 6, and wherein the metal structure 8 substantially represents the base structure of the device 1. This occurs in a separate over molding process, so that the component—the device 1—does not have to be injection-molded onto the cross member 2. The base structure of the device is likewise based on topology optimization, wherein any reinforcing ribs are preferably arranged in a loading direction.

The base body 6 is preferably designed as a thermoset or thermoplastic, particularly as polyoxymethylene. However, other materials are also conceivable, such as polyamide, polypropylene, fiber composite plastics, or glass fiber mat thermoplastics.

In the illustrated embodiment, the front connecting region 3 of the polymeric base body 6 is designed in a shell shape and is open upward. In addition, the front connecting region 3 is reinforced by the formation of stiffening ribs 20 extending transversely to the longitudinal extent of the base body 6. Furthermore, the illustrated reinforcing ribs 20 are arranged between two side walls 19, 19.1, which extend along the bow segments 11, 11.1 of the first metal bow 8. Further embodiments of the reinforcing ribs (not shown) can of course be designed in all geometric shapes, particularly diagonal, y-shaped, cross-shaped, etc.

Therefore, the metal structure 8 can be described as bow-shaped, because the metal structure 8 lies against the contour of the cross member 2 or lies around the contour of the cross member 2 by means of a segment, and the partial bow segments can be described as legs that protrude from the cross member 2 in other directions.

At the end of the front connecting region 3 directed toward the engine compartment and thus forward, an additional connecting device 7 is formed, which is provided as a firewall connection in the embodiment shown. Such a coupling can optimize the natural frequency of a steering column.

Figure 4:
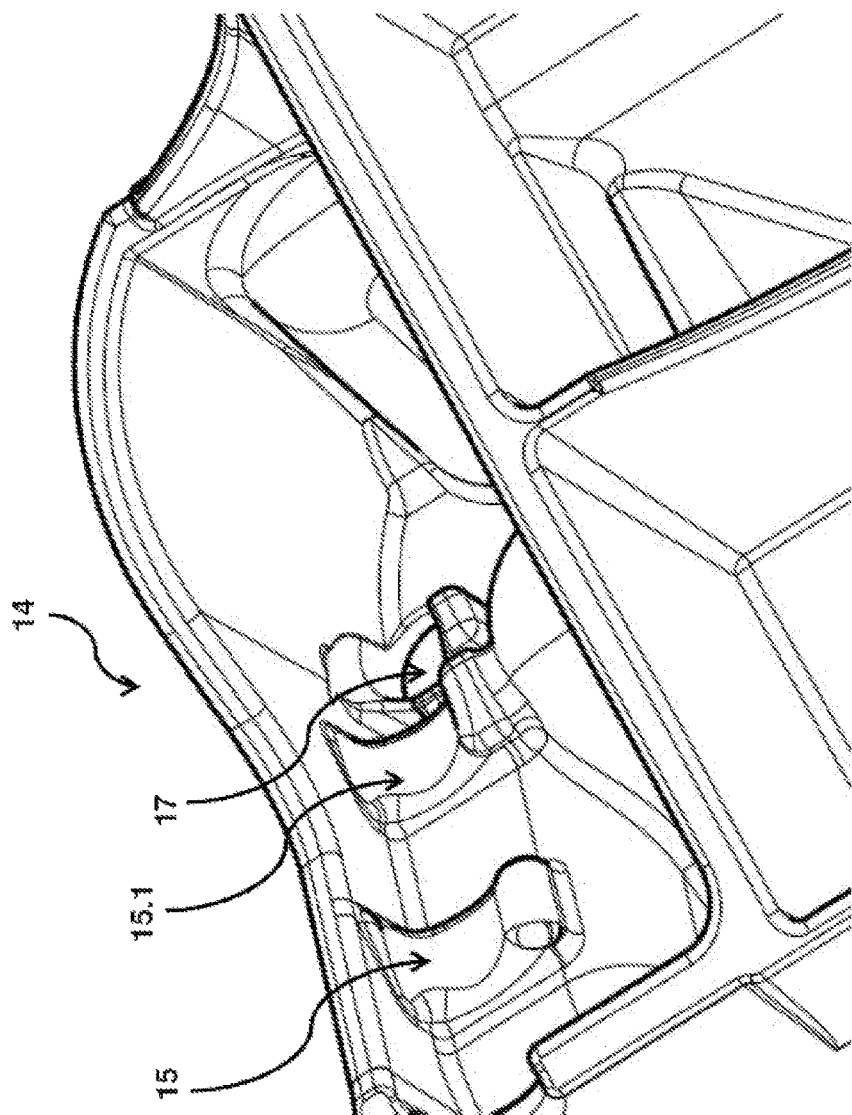
FIG. 4 is a magnified view of the guide groove segment in the front connecting region of the device for connecting a steering column of the embodiment in FIG. 1.
Figure 5:
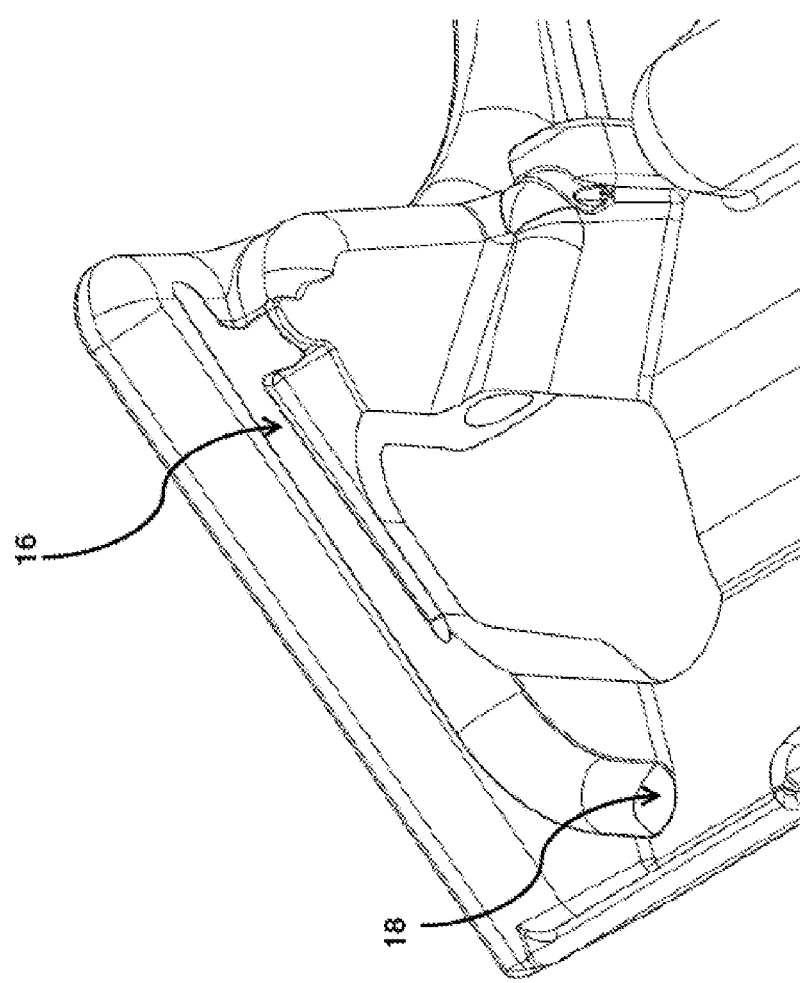
FIG. 5 is a magnified view of the guide groove segment in the rear connecting region of the device for connecting a steering column of the embodiment in FIG. 1.

An accommodating pocket 14, 14.1 is formed on each of the side walls 19, 19.1 in order to accommodate the second metal bows 9, 9.1, which are provided for fastening the base body 6 and the first metal bow 8 at least partially embedded and/or enclosed in the base body 6. Two guide groove segments 15, 15.1 and accordingly 15.2 and 15.3 are formed in each accommodating pocket 14, 14.1, as shown by the accommodating pocket 14 in FIG. 4 for example, so that the assembly is made easier, the second metal bows 9, 9.1 are securely retained on the base body 6, and the first metal bow 8 is securely retained on the cross member 2. As can be seen in FIG. 1, a further guide groove segment 15.5, 15.6, which extends into the cross member-accommodating region 4, is formed in the transition region of each accommodating pocket 14, 14.1 to the cross member-accommodating region 4 in the preferred embodiment shown.

In a further embodiment (not shown), either several guide groove segments or merely one continuous guide groove can be formed, wherein the guide groove optionally can be integrated in the corresponding side wall 19, 19.1.

In addition, in the preferred embodiment, an accommodating opening 17, 17.1 for accommodating the corresponding second metal bow 9, 9.1 is formed in the accommodating pocket 14, 14.1.

It becomes apparent to a person skilled in the art that it is also possible to form the front connecting region 3 as a solid body, such as in a skeleton manner or from a combination of the variants mentioned herein (not shown). Of course, the same applies analogously to the entire design of the base body 6. In particular, it becomes apparent to a person skilled in the art that further reinforcing structures, retainers, and/or cable guides can be attached to and/or integrated on the entire base body 6 (not shown). Therefore, these embodiments are not described further herein.

As shown in FIG. 3, the cross member-accommodating region 4 of the base body 6 is designed in such a way so as to extend around the cross member 2 substantially in a contacting manner. Furthermore, as shown in FIG. 3, an opening 21 is provided for accommodating the cross member, having approximately the width of the cross member 2, and is formed along the entire transverse extent of the base body 6. The transition region to the front connecting region 3 is preferably designed as a continuous bounding or supporting wall, which simultaneously fulfills the function of reinforcing the base body. The bottom region of the cross member-accommodating region 4 is not surrounded by the otherwise present plastic matrix of the base body 6 in the region of the contacting bow segments 11, 11.1 of the first metal bow 8. Therefore, at least partially bonded fastening of the bow segments 11, 11.1 to the cross member 2, particularly by means of thermal joining, is possible without subjecting the polymeric base body 6 to damaging heat input. The corresponding bow segment 11, 11.1 is preferably completely welded to the cross member in this region (not shown).

In other words, the bottom region of the cross member-accommodating region 4 is designed to have two holes in the region of the bow segments 11, 11.1 lying against the cross member 2. The holes are designed so that the bow segments 11, 11.1 are still surrounded by the polymeric matrix of the base body 6 in the transition regions from the front connecting region 3 to the cross member-accommodating region 4 and from the cross member-accommodating region 4 to the rear connecting region 5 for the purposes of guidance and stability. In these transition regions, the bow segments 11, 11.1 are fully enclosed by the plastic in the illustrated preferred embodiment. However, it is also conceivable that these transition regions are designed as guide groove segment(s) or a guide groove (not shown).

The integration of the bow segments 11, 11.1 of the bow-shaped metal structure 8 into the base body 6 makes it possible for the base body 6 to assume a supporting function against buckling of the bow segments 11, 11.1 in the relevant directions. Thus, when the connecting device 1 is loaded as intended, the base body 6 serves to retain the metal structure 8 in the shape of the metal structure 8 shown in the figures. This ensures that the force to be introduced into the cross member 2 is predominantly introduced by means of the metal structure 8, and therefore the metal structure 8 is the main load path.

The segment located between the holes in the central bottom region has a tongue-like shape, and a Y-shaped reinforcing rib is provided on the bottom side of the segment, as shown by FIG. 2 in particular. One leg of the reinforcing rib extends along the center axis of the tongue-like segment and protrudes into the front connecting region 3. In addition, the two other legs of the reinforcing rib extend in such a way that these legs end substantially next to or at the accommodating openings 18, 18.1 of the second metal bows 9, 9.1.

Of course, it is obvious to a person skilled in the art that the Y-shaped reinforcing rib described above has the described shape as an example, and this example shape is representative of a multitude of possible rib geometries. The rib geometries can be designed in all geometric versions, such as X-shaped, I-shaped, or as a bead, and therefore are not described in more detail herein.

Furthermore, the transition region to the rear connecting region 5 is preferably not designed as a continuous bounding or supporting wall, but rather as a rib that extends substantially in the region of the tongue-shaped segment transversely to the base body 6. Therefore, the transition region to the rear connecting region simultaneously fulfills the function of reinforcing the base body 6. In addition, guide grooves 16 for accommodating each of the second metal bows 9, 9.1 protrude into the cross member-accommodating region 4. These guide grooves 16 are formed in the rear connecting region 5. However, it is obvious that this is not mandatory and, in an embodiment according to the invention, the transition region just described can also be designed as an at least partially continuous bounding or supporting wall (not shown).

In the preferred embodiment, the rear connecting region 5 of the base body 6 is likewise designed in the shape of a shell and is open upward, wherein one accommodating opening 18, 18.1 for each of the second metal bows 9, 9.1, particularly for the leg end 13, 13.1 thereof, is arranged in a rear segment of the rear connecting region 5. In addition, a connecting device 23 is integrally injection-molded onto the rear end of the rear connecting region, which rear end of the rear connecting region is designed as a terminating wall in the preferred embodiment, wherein the connecting device 23 is formed with two reinforcing ribs. This connecting device is used, for example, to accommodate a dashboard or other devices.

Of course, particularly in the context of the rear connecting region 5, designs of the reinforcing structures are limited neither to the number thereof nor to a certain geometric design or arrangement. Rather, all designs obvious to a person skilled in the art should be included thereunder.

A guide groove 16, 16.1 for the corresponding second metal bow 9, 9.1 is formed along each side wall of the rear connecting region 5. Each guide groove leads directly into the corresponding accommodating opening 18, 18.1.

In a further embodiment not shown, at least one guide groove segment is formed. In addition, the guide groove or the at least one guide groove segment can extend into the cross member-accommodating region and can be part of the side wall in at least some segments.

Figure 6:
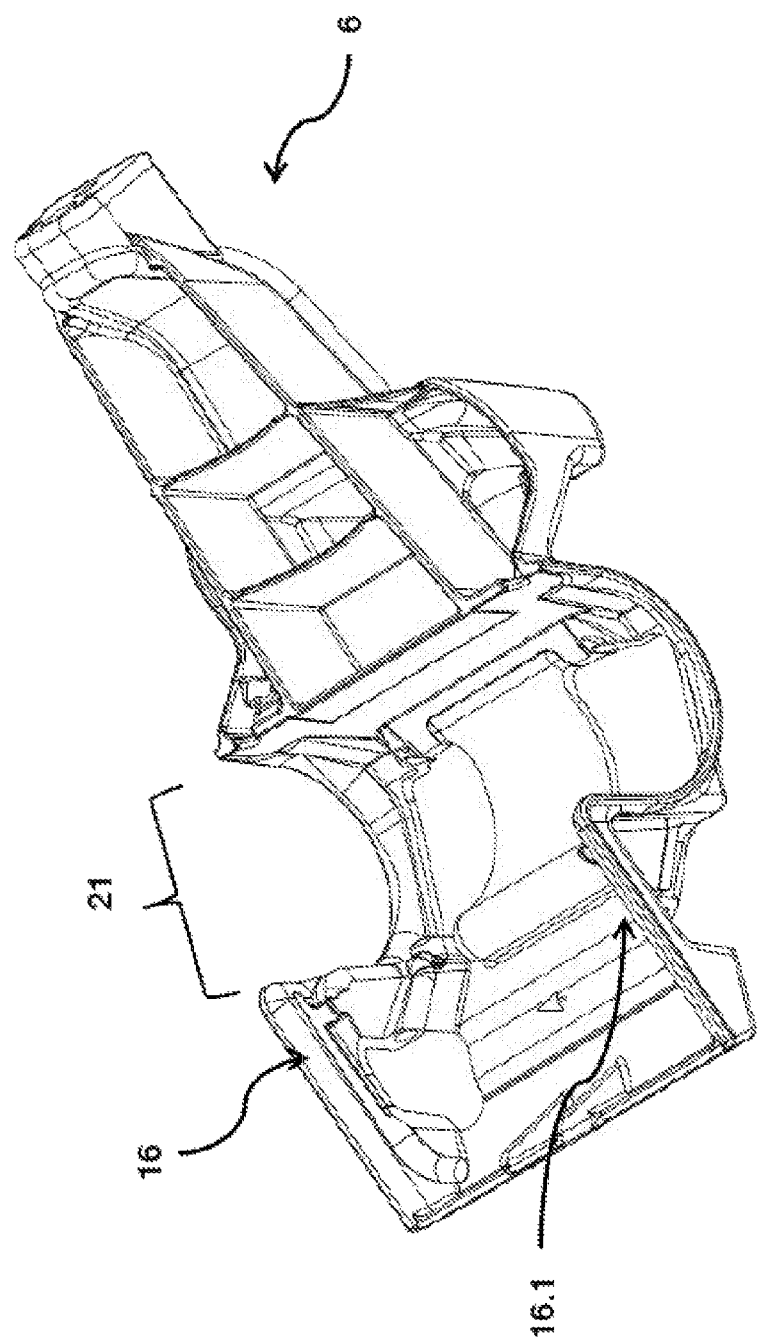
FIG. 6 is a perspective view of the embodiment, shown in FIG. 1, of the device for connecting a steering column with the metal structure hidden.

For illustration, FIG. 6 shows a magnified view of the guide groove segment in the rear connecting region 16 of the device 1 with the metal bows 8, 9, 9.1 hidden. In addition to the formed guide groove 16 and the accommodating opening 18, a cut-out is introduced in a region of the side wall, which cut-out is formed in each of the two side walls of the rear connecting region 5. The function becomes apparent with reference to FIG. 1, which makes it clear that the leg ends 25, 25.1 of the first metal bow 8 are not enclosed by the plastic matrix of the base body 6 in this region and are each in contact with the corresponding second metal bow 9, 9.1. The corresponding metal bows 8, 9, 9.1 are preferably thermally joined in this region, whereby the base body is given additional stability. Thus, the cut-out is dimensioned in such a way that thermal joining is possible in a trouble-free manner, without causing heat input that would damage the base body 6. Of course, other methods of bonded or force-closed connection known in the prior art would also be conceivable.

FIG. 7 shows a perspective view of the first metal bow 8 of the device 1 for connecting a steering column of the preferred embodiment of the invention. As already mentioned above, the first metal bow 8 corresponds to a load path of the device 1 determined in a topology analysis and, at least in partial regions, is surrounded by the polymeric matrix of the base body 6 and/or at least embedded therein. The first metal bow 8 is bent substantially in a V shape or U shape. A front region 10 of the first metal bow 8 is preferably bent upward in order to be able to better absorb a corresponding load. Therefore, this segment is designed so that force can be introduced into the raised side. As shown in FIG. 7, the metal bow 8 connects two bow segments 11, 11.1 to each other, which bow segments 11, 11.1 protrude away from the crossmember and represent the actual bows of the at least one metal structure. Therefore, in this embodiment, the bow segments are combined into the bow-shaped metal structure. The angle between the bow segments 11, 11.1 and the upward bent front region 10 is preferably at least 90 degrees. Furthermore, as can also be seen in FIGS. 2 and 3, the first metal bow 8 is bent around the cross member contour and lies against the cross member in a rear region 12, 12.1 of the first metal bow 8 in order to be joined to the cross member 2 at the exposed points in the region of the holes in the bottom region of the cross member-accommodating region 4, as illustrated above. In addition, as likewise already illustrated above, the leg ends 25, 25.1 are bent upward and inward in a region not surrounded by the plastic matrix of the base body 6, in such a way that the leg ends 25, 25.1 preferably lie against the inside of the at least one second metal bow 9, 9.1 and can be connected to the at least one second metal bow 9, 9.1 in a bonded or force-closed manner. In an alternative embodiment (not shown), the ends 25, 25.1 can be largely or completely surrounded by the polymeric matrix. The first metal bow 8 is preferably thinner than the second metal bow 9, 9.1. A thickness of at least 4 mm and particularly 6 mm is preferably used, and the production preferably occurs in a wire-bending machine.

FIG. 8 shows a perspective view of the second metal bow 9 of the device 1. In the region of the cross member holder 4, the second metal bow 9 is designed as a closing bow in such a way that the middle region of the second metal bow 9 is bent around the cross member, lies against the cross member at least partially, and is connected to the cross member in a bonded manner, preferably by thermal joining. At least in this region (i.e., the region lying against the cross member 2), the second metal bow 9, 9.1 of the preferred embodiment is wider than the diameter of the remaining segments of the second metal bow 9, 9.1 and has a height that is less than the diameter of the remaining segments of the second metal bow 9, 9.1. Such a design enables easier thermal joining and can be produced in a pressing tool without further work steps during the production of the second metal bow 9, 9.1. The shape of the second metal bow 9,9.1 always depends on the geometry of the cross member 2 (the same also applies to the first metal bow 8).

Furthermore, the second metal bow 9, 9.1 is bent to correspond over its longitudinal course to the corresponding at least one guide groove segment 15, 15.1, 15.2, 15.3, 15.4, 15.5 and the largely continuous guide groove 16, 16.1 of the front and rear connecting regions 3, 5, and can be or is arranged therein.

In a preferred embodiment, the second metal bow 9, 9.1 is furthermore bent in such a way that the leg ends 13, 13.1 thereof can each be inserted through a corresponding accommodating opening 17 and 18 or 17.1 and 18.1 of the corresponding accommodating pocket 14, 14.1. It is also conceivable that the leg ends 13, 13.1 can only be inserted therein or both variants can be implemented in combination. The second metal bow 9, 9.1 also corresponds to a load path of the device 1 determined in a topology analysis. The second metal bow 9, 9.1 is not encased by the polymeric matrix of the base body 6, but rather is inserted into and/or through the base body 6.

In a preferred embodiment (not shown), the corresponding leg ends 13, 13.1 are provided with an external thread so that a steering column can be screwed on. Of course, all other methods of bonded, positively locking, or force-closed connection known in the prior art are also possible.

The second metal bow 9, 9.1 is preferably thicker than the first metal bow 8. A thickness of at least 6 mm and particularly 8 mm is preferably used. Production of the second metal bow 9, 9.1 preferably occurs in advance in a wire-bending machine or in a pressing tool, wherein the external threads described above are preferably rolled on in advance.

Overall, it is advantageous in the assembly to first fasten the preferably two second metal bows 9, 9.1 to the cross member by thermal joining, to place the base body 6 with the first metal bow 8 integrated therein onto the cross member 2 and the corresponding leg ends 13, 13.1 from below in a further step, to fasten the exposed bow segments 11, 11.1 of the first metal bow 8 to the cross member 2 by thermal joining, and finally to connect the leg ends 25, 25.1 of the first metal bow 8 to the corresponding second metal bow 9, 9.1 by thermal joining. In addition, a further form closure of the corresponding metal bow 9, 9.1 with respect to the cross member 2 is achieved by the subsequent mounting of the steering column.

Figure 9:
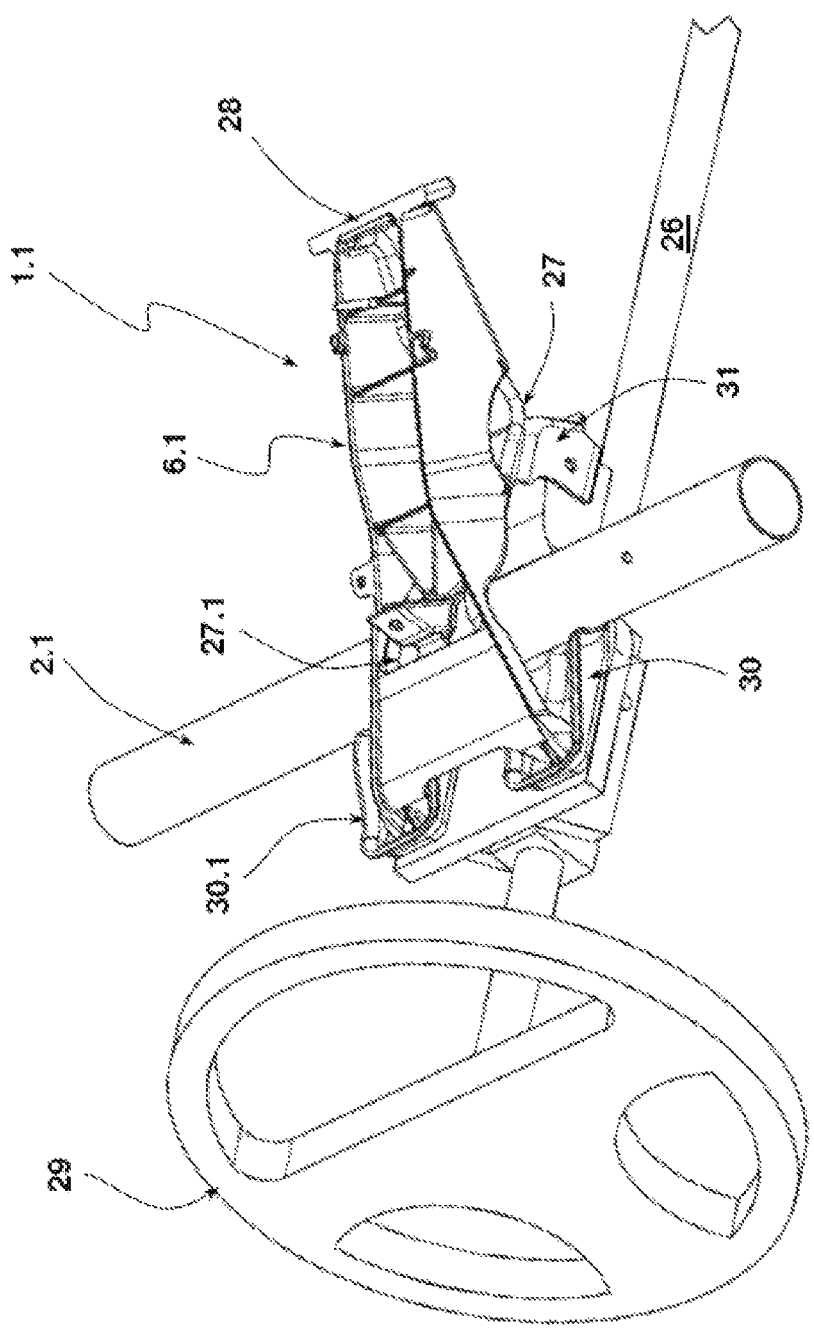
FIG. 9 is a perspective view of a second embodiment of the device for connecting a steering column to a cross member according to the present invention.

FIG. 9 shows a further embodiment of a device 1.1 for connecting a steering column 26 to a cross member 2.1. The device 1.1 is fundamentally constructed like the device explained in the embodiment described above. In contrast to the embodiment described above, the device 1.1 has two individual bows 27, 27.1 which are retained in the base body 6.1. These bows 27, 27.1 correspond to the bow segments 11, 11.1 of the embodiment described above. A plate-like segment 28 can connect the device 1.1 to the chassis so as to point in the direction of travel. The plate-like segment 28 is provided in the front connecting region of the base body 6.1. In the base body 6.1 produced of plastic, there is a reinforcing plate at this location. FIG. 9 also illustrates the spatial arrangement of the steering column 26 with a steering wheel 29 arranged thereon in relation to the cross member 2.1. In the embodiment described above, a steering column is also connected to the cross member 2 by means of the device 1. In the embodiment of FIG. 9, the legs of the bows 27, 27.1 located in the rear connecting region are equipped with a thread at the ends thereof, and the steering column is connected to the thread. Instead of the second metal bows above the cross member in the embodiment of the device 1 of the preceding figures, metal shells 30, 30.1 arranged on the bottom side of the cross member 2.1 are provided in this embodiment of FIG. 9. The metal shells 30, 30.1 are connected to the front ends of the bows 27, 27.1, wherein the end segments of the bows 27, 27.1 reach through the metal shells 30, 30.1 and connect in the direction of the front connecting region by means of a connecting support 31. The cross member 2.1 is thus located between the bows 27, 27.1 and the metal shells 30, 30.1. Because of the contouring of the metal shells 30, 30.1 and of the bows 27, 27.1 extending over a segment of the contour of the cross member 2.1, effective introduction of force into the cross member 2.1 is enabled. As shown in FIG. 9, the bows 27, 27.1 are accommodated in the base body 6.1 in a positively locking manner in a load direction of the main load path.

The preceding statements relate to the device 1, 1.1, which has been described in the context of connecting a steering column to a cross member. Furthermore, such a device can also be used to connect other objects, such as an airbag retainer, to such a cross member. Of course, this device is then a separate device.

The preceding description relates only to preferred embodiments and should not restrict the claims to these preferred embodiments.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

LIST OF REFERENCE SIGNS 1, 1.1 Device for connecting a steering column
2, 2.1 Cross member
3 Front connecting region
4 Cross member-accommodating region
5 Rear connecting region
6, 6.1 Base body
7 Connecting device
8 First metal bow
9, 9.1 Second metal bow
10 Front region
11, 11.1 Bow segment
12, 12.1 Rear region
13, 13.1 Leg end
14, 14.1 Accommodating pocket
15, 15.1, 15.2, 15.3, 15.4, 15.5 Guide groove segment
16, 16.1 Guide groove segment
17, 17.1 Accommodating opening
18, 18.1 Accommodating opening
19, 19.1 Side wall
20 Reinforcing rib
21 Opening
22 Reinforcing rib
23 Connecting device
24, 24.1 Outer wall
25, 25.1 Leg end
26 Steering column
27, 27.1 Bow
28 Segment
29 Steering wheel
30, 30.1 Metal shell
31 Connecting support

The invention claimed is:

1. A device for connecting a steering column to a cross member positioned between two A-pillars of a vehicle, comprising:
   a base body with a front connecting region, a cross member-accommodating region, and a rear connecting region;
   at least one metal structure, the at least one metal structure comprising at least one metal bow that extends from the front connecting region to the rear connecting region;
   wherein the base body supports the at least one metal structure;
   wherein the at least one metal structure is a main load path for introducing a force into the cross member;
   wherein the base body is connected to the at least one metal structure in the direction of the main load path at least in the front connecting region and in the rear connecting region; and
   wherein the base body is configured to couple to a firewall designed for an engine compartment to form a further load path.

2. The device of claim 1, wherein the base body is produced of a fiber-reinforced polymeric material.

3. The device of claim 1, wherein the at least one metal bow is an at least one first metal bow, the at least one metal structure further comprising at least one second metal bow.

4. The device of claim 3, wherein the at least one second metal bow is designed as a closing bow, insertable at least into or through the base body in order to strengthen a supporting function of the base body, and connected to the base body in at least a form-closed or bonded manner in a direction of the main load path.

5. The device of claim 3, further comprising:
   a rear region of the at least one first metal bow that lies against the cross member over a certain extent in a circumferential direction, wherein at least one end is bent in such a way that the at least one end lies against an inside of the at least one second metal bow.

6. The device of claim 5, wherein in the rear connecting region, the ends of the at least one first metal bow are not overmolded by the base body, and are connected to the at least one second metal bow in a bonded manner.

7. The device of claim 3, wherein:
the at least one second metal bow is two second metal bows that each lie against a contour of the cross member at least partially in a region of an opening of the cross member-accommodating region and are bonded to the cross member;
the two second metal bows are further shaped in such a way that each correspond over a longitudinal course thereof to a corresponding at least one guide groove segment or a corresponding at least one continuous guide groove of the front connecting region and rear connecting region and are arranged therein; and
the two second metal bows each have an end, the ends bent in such a way that the ends can each be inserted at least into or through an accommodating opening of an accommodating pocket and an accommodating opening of the rear connecting region.

8. The device of claim 7, wherein the two second metal bows have a width in the region lying against the cross member that is greater than the diameter of the remaining segments of the two second metal bows, and a height that is less than the diameter of the remaining segments of the two second metal bows.

9. The device of claim 7, wherein a thread for connecting the steering column is formed at each of the ends of the two second metal bows.

10. The device of claim 7, wherein the two second metal bows have a thickness that is greater than the thickness of the at least one first metal bow.

11. The device of claim 3, wherein the at least one first metal bow is not covered or coated with a plastic in the cross member-accommodating region, and the at least one first metal bow is connected at least partially in a bonded manner to the cross member.

12. The device of claim 1, wherein:
the front connecting region of the base body is open upward in a shell shape and further comprising:
side walls;
at least one accommodating pocket on each of the side walls having at least one accommodating opening for at least one second metal bow to be inserted at least in or through;
at least one reinforcing structure extending diagonally or in a cross shape formed between the side walls; and
and a connecting device integrally injection-molded on a front end of the front connecting region;
the cross member-accommodating region of the base body is designed to extend around in accordance with a geometric design of the cross member while lying against the cross member, in such a way that the cross member-accommodating region has over its entire transverse extent on its top side an opening for accommodating the cross member, and on its bottom side at least one reinforcing structure in a Y shape, X shape, or I shape; and
the rear connecting region of the base body is open upward in a shell shape, has at least one accommodating opening for the at least one second metal bow, and at least one connecting device integrally injection-molded on a rear end of the rear connecting region.

13. The device of claim 12, wherein the at least one accommodating pocket of the front connecting region has at least one guide groove segment or at least one continuous guide groove, which extends in the cross member-accommodating region.

14. The device of claim 12, wherein an outer wall of the at least one accommodating pocket is part of at least one guide groove segment or at least one continuous guide groove.

15. The device of claim 1, wherein the base body is composed of polyamide, polypropylene, polyoxymethylene, fiber composite plastics, or glass fiber mat thermoplastics.

16. A device for connecting a steering column to a cross member positioned between two A-pillars of a vehicle, comprising:
a base body with a front connecting region, a cross member-accommodating region, and a rear connecting region;
at least one metal structure, the at least one metal structure comprising at least one metal bow that extends from the front connecting region to the rear connecting region;
wherein the base body is produced of a fiber-reinforced polymeric material and supports the at least one metal structure;
wherein the at least one metal structure is a main load path for introducing a force into the cross member; and
wherein the base body is connected to the at least one metal structure in the direction of the main load path at least in the front connecting region and in the rear connecting region.

17. The device of claim 16, wherein the base body is configured to couple to a firewall designed for an engine compartment to form a further load path.

18. A device for connecting a steering column to a cross member positioned between two A-pillars of a vehicle, comprising:
a base body with a front connecting region, a cross member-accommodating region, and a rear connecting region;
at least one metal structure comprising at least one first metal bow and at least one second metal bow, the at least one first metal bow extends from the front connecting region to the rear connecting region;
wherein the base body supports the at least one metal structure;
wherein the at least one metal structure is a main load path for introducing a force into the cross member;
wherein the base body is connected to the at least one metal structure in the direction of the main load path at least in the front connecting region and in the rear connecting region; and
wherein the at least one second metal bow is designed as a closing bow, is insertable at least into or through the base body in order to strengthen a supporting function of the base body, and is connected to the base body in at least a form-closed or bonded manner in a direction of the main load path.

19. The device of claim 18, wherein the base body is configured to couple to a firewall designed for an engine compartment to form a further load path.

20. The device of claim 18, wherein the base body is produced of a fiber-reinforced polymeric material.

* * * * *